United States Patent [19]

Stocker et al.

[11] Patent Number: 4,805,313
[45] Date of Patent: Feb. 21, 1989

[54] APPARATUS FOR ILLUMINATING A SIGHT ON A WEAPON

[75] Inventors: Arthur Stocker, Munich; Werner Schmid, Irschenberg, both of Fed. Rep. of Germany

[73] Assignee: Messerschmitt-Boelkow-Blohm GmbH, Munich, Fed. Rep. of Germany

[21] Appl. No.: 148,842

[22] Filed: Jan. 27, 1988

[30] Foreign Application Priority Data

Jan. 29, 1987 [DE] Fed. Rep. of Germany ....... 3702560

[51] Int. Cl.⁴ ............................ F41G 1/06; F41G 1/16
[52] U.S. Cl. ..................................................... 33/241
[58] Field of Search ............... 33/233, 235, 241, 242, 33/243; 42/100–103; 356/251, 253, 254, 255

[56] References Cited

U.S. PATENT DOCUMENTS 3,641,676  2/1972  Knutsen et al. ........................ 33/241
4,136,963  1/1979  Budden .............................. 33/241 X
4,658,139  4/1987  Brennan .............................. 33/241 X

*Primary Examiner*—Harry N. Haroian
*Attorney, Agent, or Firm*—W. G. Fasse; D. H. Kane, Jr.

[57] ABSTRACT

The contrast between a target and the target markers or line divisions on a graticule disk of a sight, especially for a hand-held weapon, is enhanced by a device which illuminates the graticule disk with refected liight. The device has an attachment member which is rapidly mountable to and removable from the sight housing. The attachment member carries a frame which holds glass bodies filled with gaseous tritium and coated on the reflecting surfaces with a luminous lacquer or paint. The light entry and exit sides are not coated. The attachment member holding the frame permits shifting the frame between a first effective position in which light collected by the tritium filled glass bodies is transmitted onto the graticule disk, and a second ineffective position in which light is not transmitted to the graticule disk.

12 Claims, 2 Drawing Sheets

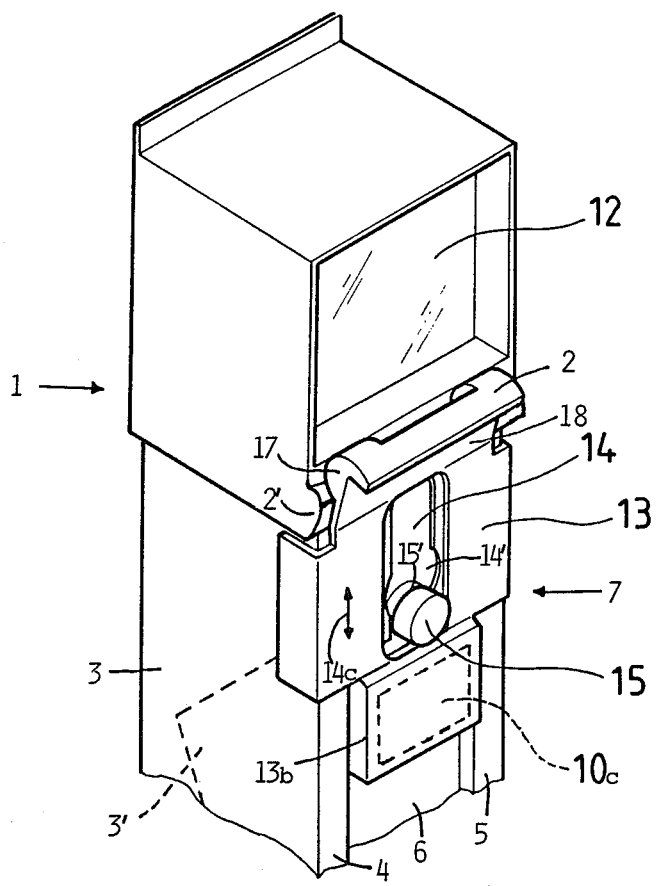
FIG. 1
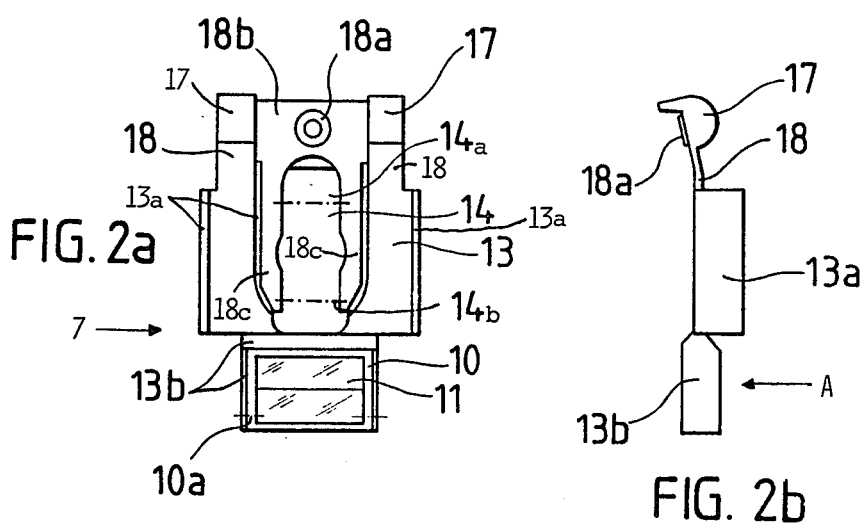
FIG. 2a
FIG. 2b

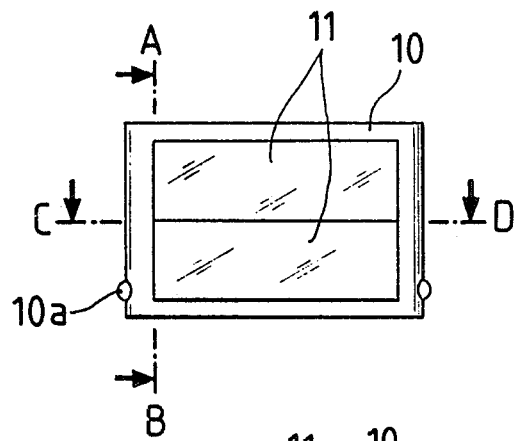
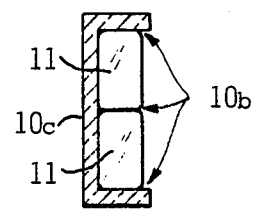
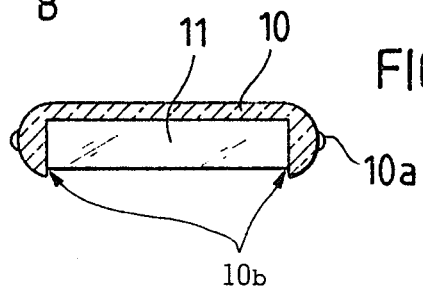
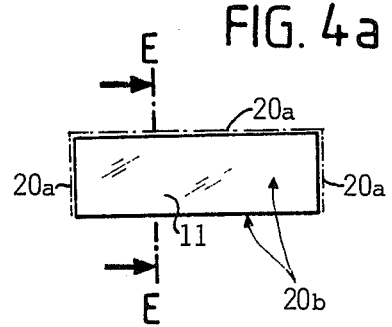
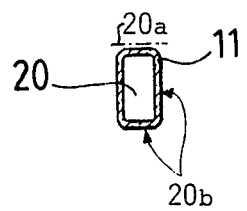

APPARATUS FOR ILLUMINATING A SIGHT ON A WEAPON

FIELD OF THE INVENTION

The invention relates to an apparatus for illuminating a sight on a weapon, more specifically, for illuminating the line division disk of reflecting sights for amplifying the contrast between the target and the target markers in the sight.

DESCRIPTION OF THE PRIOR ART

Anti-tank weapons and similar weapons must be equipped with very expensive and involved night vision sighting equipment, if such weapons are to be used at night and under adverse visibility conditions. However, such expensive equipment is affordable only in connection with high quality long range weapons systems. The use of such high quality night sighting devices has not been possible heretofore in so-called hand-held weapons of this type so that these weapons are not usable when the visibility is poor.

U.S. Pat. No. 3,641,676 discloses a sight for a weapon with a front sight and with a rear sight, wherein both the front sight and the rear sight are provided with their own self-illuminating elements. In certain examples of said U.S. Pat. No. 3,641,676 the illuminating element for the rear sight appears to be installed permanently while the illuminating element for the front sight is attached or removed as needed. Such a structure requires a direct tampering with the sight which is undesirable because it can lead to misadjustments of the sight.

OBJECTS OF THE INVENTION

In view of the foregoing it is the aim of the invention to achieve the following objects singly or in combination:

to provide an illuminating device for a weapon sight which is quickly mountable and dismountable, and which is relatively inexpensive for weapons of the above described hand-held type, whereby a direct mechanical influence on the sight is to be avoided to prevent a misadjustment of the sight;

to provide a sight with an illuminating device which will enable the use of these weapons even under adverse visibility conditions and at night when the combat area is illuminated by artificial means; and to construct the illuminating device and its mounting member so that the illuminating device can be easily brought from a non-use daytime ineffective position into a use or effective position by a shifting movement.

SUMMARY OF THE INVENTION

The present apparatus for illuminating the lines on a graticule disk of a reflector sight is characterized by one or more hollow glass bodies supported in a carrier frame and filled with gaseous tritium for producing light. The glass bodies are coated on each of at least three narrow sides with a reflecting luminous or fluorescent lacquer for reflecting light into the reflector sight. The carrier frame is connected to a slidable attachment member which is constructed for a reversible, rapid mounting connection to a view finder of the reflector sight. The mounting is such, that in an effective position the apparatus functions as a light source or light collector, and in an ineffective position the apparatus permits using the reflector sight in the normal way without the extra light source. Reversible here means shiftable.

BRIEF DESCRIPTION OF THE DRAWINGS

In order that the invention may be clearly understood, it will now be described, by way of example, with reference to the accompanying drawings, wherein:

FIG. 1 is a reflector sight and view finder for a hand carried weapon with a rapid mounting device for the attachment of a light source or light collector for the illumination of the line disk or graticule of the sight with a so-called "betalight";

FIG. 2a is a view of the present apparatus showing the attachment member and the "betalight" in the assembled state, whereby the view is in the direction of the arrow A in FIG. 2b;

FIG. 2b is a side view of the device shown in FIG. 2a;

FIG. 3a is a plan view in the direction of the arrow A in FIG. 2b showing a carrier frame for supporting the so-called "betalights";

FIG. 3b is a sectional view along section line A–B in FIG. 3a;

FIG. 3c is a sectional view along section line C–D in FIG. 3a showing the carrier frame of transparent material;

FIG. 4a is a simplified front view of a glass body of the "betalight"; and

FIG. 4b is a sectional view along section line E—E in FIG. 4a.

DETAILED DESCRIPTION OF PREFERRED EXAMPLE EMBODIMENTS AND OF THE BEST MODE OF THE INVENTION

FIG. 1 shows the illuminating apparatus or device 7 according to the invention in combination with a sight and view finder 1 for a hand-held weapon not shown. The sight and view finder 1 has an upper housing portion 2 with a view finder window 12. The present illuminating device 7 is attached to a lower housing portion 3 in which a graticule or line disk 3' of the sight is mounted. The device 7 has a carrier frame 10 for holding illuminating glass bodies or betalights 11, and a slidable attachment member 13 for securing the frame 10 to the lower housing portion 3. Two guide rails 4 and 5 on the lower housing portion 3 flank a window 6 for guiding the carrier frame 10.

Light passing through the window 6 illuminates the graticule 3' when the attachment 13 to which the carrier frame 10 is secured, is in the first effective position indicated at 14a in FIG. 2a. In the first effective position 14a an upper edge of an elongated hole 14 of the attachment member 13 rests against a stop bolt 15 in such a position that the light collecting hollow glass bodies 11 to be described in more detail below, are in front of the window 6. In FIG. 1 the attachment member 13 is in the second, ineffective position in which a lower edge of the elongated hole 14 rests against the stop bolt 15. In the second ineffective position shown in FIG. 1, the light collecting hollow glass bodies 11 are shifted upwardly out of the window 6, thus, the attachment member 13 can be shifted up and down as indicated by the double arrow 14c in FIG. 1. For this purpose the elongated hole 14 has a cut-out 14' through which the stop bolt 15 fits when the attachment member 13 is first secured to the sight 1. The stop bolt 15 is rigidly secured to the lower housing portion 3. The stop bolt 15 has a groove 15', for example, a circumferential groove which cooperates with the edges of the elongated hole 14 above and below the cut-out 14' so that the attachment member 13 is securely held in place by the engagement of the hole edges in the groove 15'. Simultaneously the just mentioned engagement guides the movement of the attachment member 14 up or down as indicated by the arrow 14c, except at the moment of insertion when the stop bolt 15 passes through the cut-out 14'.

Referring further to FIGS. 1, 2a, and 2b in conjunction, the illuminating device 7 has an upper portion forming the slidable attachment member 13 with side wall sections 13a and with a downward extension 13b. The side wall sections 13a form two channels riding on the guide rails 4 and 5 of the lower housing portion 3. The downward extension 13b holds the carrier frame 10 of the illuminating glass bodies 11 as will be described in more detail below. The slidable attachment member 13 has upwardly extending flexible spring legs 18 ending in projections or cams 17 interconnected by a leaf spring 18b riveted to a cross piece interconnecting the spring legs 18. The rivet is shown at 18a. The leaf spring 18b has downwardly extending legs 18c enclosing the elongated hole 14. The inwardly facing edges of the spring legs 18c engage the guide groove 15' as described above.

FIGS. 3a, 3b, and 3c show the carrier frame 10 for the hollow glass bodies 11. The frame 10 is made of light transparent material such as acrylic glass and encases the light collecting glass bodies 11 as best seen in FIGS. 3b and 3c. Adhesive 10b is used to secure the glass bodies 11 in the carrier frame 10. Projections 10a of the frame 10 hold the frame in the downward extension 13b with a press fit. When the attachment member 13 is in the effective position, the backside 10c of the carrier frame 10 is above the window 6. Thus, light generated and/or collected by the hollow glass bodies 11 can enter through the window 6 for illuminating the graticule 3'.

FIGS. 4a and 4b show one of the hollow glass bodies 11 which are formed as parallelepipeds having four narrow sides all of which are covered with a light reflecting luminous paint coating when only one body 11 is held in the frame 10. However, when two bodies 11 are used as shown in FIGS. 3a and 3b, the interfacing glass surfaces is not covered with the light reflecting luminous paint. Thus, as shown in FIG. 4a the narrow sides 20a are covered with the light reflecting luminous paint while the front side and the interfacing side as shown at 20b are not coated. The hollow space 20 inside the glass bodies 11 is filled with a tritium gas to form a luminescent light source. Such light sources are also known as betalights. The glass bodies 11 may be made of tubular glass pigmented with a zinc sulfide powder or a zinc silicate powder. The glass itself may have crystal grain size with an average dimension of about 20 microns. The gas filling in the hollow spaces 20 may be under a pressure of maximally about 2.5 bar. These glass bodies provide a light output of about 234 micro-lumen when they are not yet covered with the light reflecting luminous paint. The paint improves the light output. The paint is, e.g., of the type used in "toilumin" light sources.

The adhesive 10b may, for example, be a silicon adhesive which may also be used to secure two glass bodies 11 to each other along the interfacing narrow sides of the two glass bodies 11.

Referring further to FIG. 1, the upper housing portion 2 has a ridge 2' below and alongside the window 12 and somewhat spaced from the window 12. In the ineffective second position of the slidable attachment member 13 as shown in FIG. 1, the cam projections 17 engage the ridge 2' and hold the attachment member 13 in the second or ineffective position. A downward push on the attachment member 13 disengages the cam projections 17 from the ridge 2' against the effect of the flexible legs 18 and against the effect of the leaf spring 18b so that the attachment member 13 and the frame 10 may be pushed into the effective position with the light collecting glass bodies 11 on the window 6.

Although the invention has been described with reference to a specific example embodiment, it will be appreciated, that it is intended, to cover all modifications and equivalents within the scope of the appended claims.

What we claim is:

1. An apparatus for illuminating a graticule disk of a reflex sight for a weapon, comprising a carrier frame, hollow glass body means supported by said carrier frame, gaseous tritium inside said hollow glass body means, and slidable attachment means for removably securing said carrier frame holding said glass body means to said sight for a sliding movement between first and second positions so that in said first position light collected by said glass body means illuminates said graticule disk for an improved contrast between a target and lines on said graticule disk of said sight, and so that in said second position light from said hollow glass body means is prevented from illuminating said graticule disk, whereby the first position is an effective position and said second position is an ineffective position.

2. The apparatus of claim 1, wherein said glass body means comprise a parallelepiped having four narrow side surfaces covered with a light reflecting luminous paint coating.

3. The apparatus of claim 1, wherein said carrier frame comprises a frame made of transparent acrylic glass, said frame enclosing all sides of said glass body means except a light entry side, and adhesive means bonding said glass body means to said frame.

4. The apparatus of claim 1, wherein said attachment means comprise an elongated hole for sliding said attachment means with its carrier member into said first and second positions, said sight having a stop bolt extending through said elongated hole for guiding said sliding movement of said attachment means between said first and second positions defined as end positions at ends of said elongated hole.

5. The apparatus of claim 1, wherein said attachment means have cam means bearing against said sight for holding said attachment means in said second position, and spring means pressing said cam means against said sight for locking said device in said second ineffective position.

6. The apparatus of claim 4, wherein said elongated hole in said attachment means has inwardly facing edges, said stop bolt having groove means into which said inwardly facing edges reach for securing said attachment means to said sight in said effective and in said ineffective positions, whereby said spring means and cam means are effective when said inwardly facing edges of said elongated hole engage said groove means of said stop bolt, said inwardly facing edges having cutouts therein for disengaging said inwardly facing edges from said groove means for removing said attachment means from said sight.

7. The apparatus of claim 4, wherein said glass body means are made of a glass tube pigmented with a zinc sulfide powder.

8. The apparatus of claim 1, wherein said glass body means are made of a glass tube pigmented with a zinc silicate powder.

9. The apparatus of claim 1, wherein said hollow glass body means has four sides enclosed by said carrier frame, said four sides being coated with a white primer lacquer, said glass body means having a front side facing in a direction for light entrance, and also a back side facing toward said graticule disk when said attachment means are in said first effective position.

10. The apparatus of claim 9, wherein said white primer lacquer is a lacquer used for "toilumin" light sources.

11. The apparatus of claim 1, wherein said hollow glass body means comprise at least two glass bodies arranged alongside each other, said glass bodies having front and back sides free of lacquer, said bodies having narrow sides coated with a white primer lacquer except along two narrow sides facing each other.

12. The apparatus of claim 1, wherein said sight has a housing with an engagement ridge (2'), said slidable attachment means having spring biased cam means (17) for engaging said ridge to hold said attachment means and said carrier frame in said second ineffective position.

* * * * *